Feb. 28, 1950
H. L. YAGER
2,499,048
IRRIGATION TUBE JOINT FASTENER
Filed Jan. 6, 1948
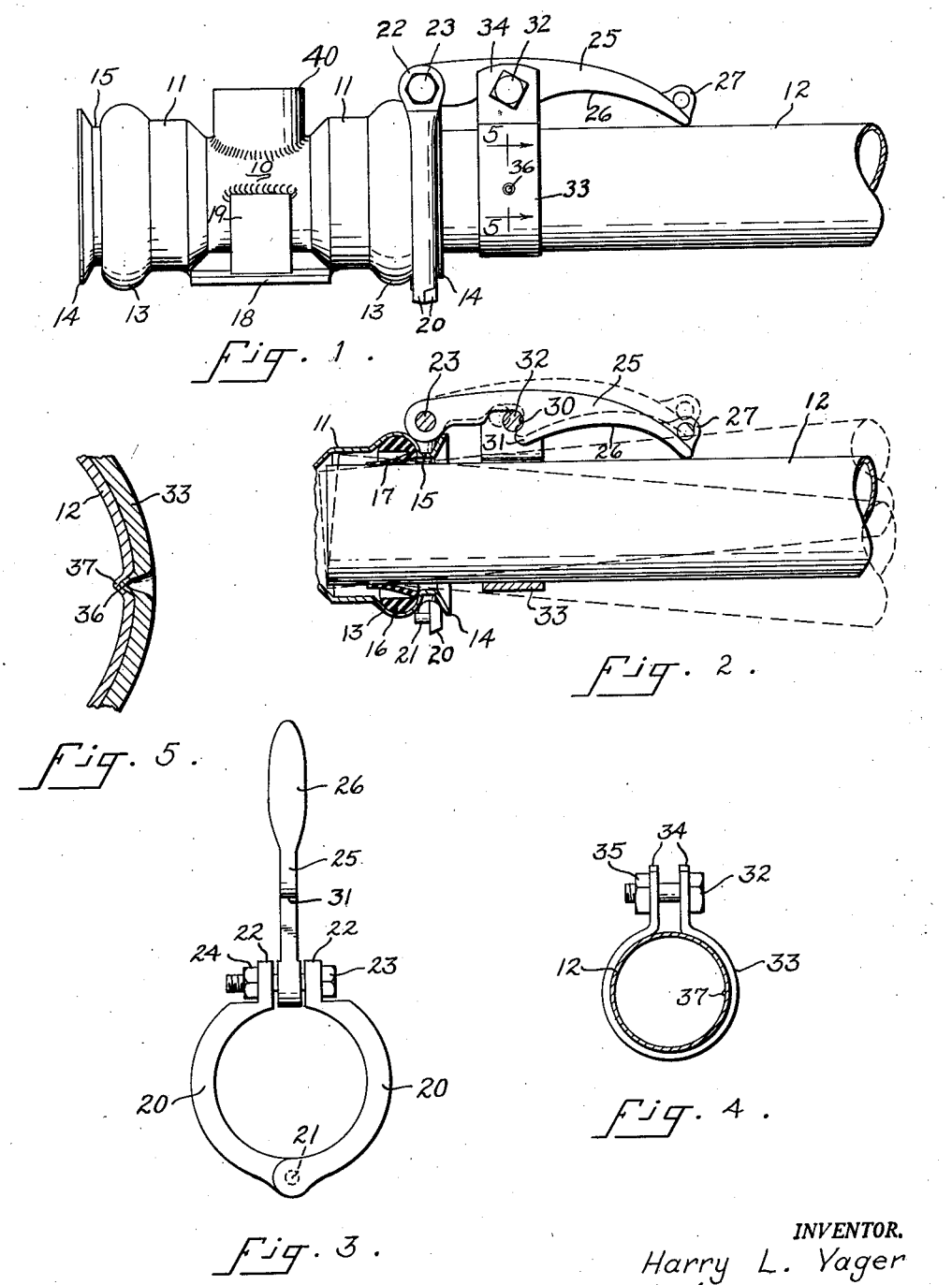
INVENTOR.
Harry L. Yager
BY
Attorney Patented Feb. 28, 1950

2,499,048

UNITED STATES PATENT OFFICE 2,499,048

IRRIGATION TUBE JOINT FASTENER

Harry L. Yager, Portland, Oreg.

Application January 6, 1948, Serial No. 660

3 Claims. (Cl. 285—172)

My present invention relates to means for fastening lengths of tubing together in end to end relation. The present invention is of particular utility in portable field irrigation systems. Such systems have become well known in recent years as a means of distributing irrigation water in localities where water is available in limited quantities only and hence must be most efficiently utilized. In order to avoid wastage of water, and in order to avoid utilizing a large percentage of the tillable land for a network of canals, laterals and distribution ditches, portable irrigation systems have been devised comprising lengths of tubing which may be laid across the fields to distribute water to desired localities. The tubing preferably comprises relatively long lengths of thin-walled tubing, each length of which may be easily handled by one man. In order that a line of such tubing may be quickly moved from locality to locality, a slip-joint coupling may be provided to join each pair of lengths. Such a coupling member comprises a sleeve into which the ends of the tubing may be inserted, the sleeve having flexible gaskets adapted to embrace the ends of the tubing and be sealed thereagainst by the pressure of the water being distributed. Each end of the coupling is provided with an annular flange having a gap therein, and the end of the tubing is provided with a tongue adapted to slip through the gap and lock the tubing and coupling together when one is rotated relative to the other. A disadvantage of this form of coupling device resides in the necessity for rotating the one member relative to the other, particularly in cases where a joint is made or broken intermediate the ends of a long line of tubing. Quite often the weight of the tubing with static water therein makes it impossible to rotate the one relative to the other, or a break in the line of tubing might not be made at exactly the desired point. Furthermore, the lengths of tubing are preferably made of thin metal, and in many instances of such relatively soft metal as aluminum, with the result that twisting force at a joint might cause rupture or weakening distortion of a length of tubing. For this and other reasons the present invention is designed to provide a coupling which may be made or broken without twisting or turning movement.

The principal object of the present invention is to provide a coupling for lengths of tubing which may be made or broken rapidly by moving one of the two members a slight amount angularly relative to the other without rotative movement.

A further object of the present invention is to provide a rapid coupling device which may be adapted to existing forms of coupling means without changing the existing forms of coupling means.

A further object of the present invention is to provide a tube coupling which may be formed of relatively few, inexpensively fabricated parts.

The foregoing and other objects and advantages of the present invention will be more readily ascertained from inspection of the following specification taken in connection with the accompanying drawings wherein like numerals refer to like parts throughout, while the features of novelty will be more distinctly pointed out in the appended claims.

In the drawings

Fig. 1 is a view in elevation of a coupling member associated with the end of a length of tubing;

Fig. 2 is a vertical section through the end of the coupling member showing a length of tubing inserted therein;

Fig. 3 is an end view of the front of an adapter collar to be mounted upon an existing coupling member;

Fig. 4 is an end view of a length of tubing having a latching clamp thereon; and Fig. 5 is a vertical section on an enlarged scale taken substantially along line 5—5 of Fig. 1.

The coupling preferably comprises a restricted central section 10 and a pair of enlarged end bells 11 of internal diameter large enough loosely to receive the ends of lengths of tubing 12. Adjacent the outer end of the end bells there are provided annular bulges 13 and annular end flanges 14 forming therebetween annular grooves 15. The bulge 13 provides means for seating annular gaskets 16 having inwardly projecting annular flaps 17 adapted to embrace the tubing. The flaps project inwardly from the outer edges of the gasket rings and are pressed firmly against the tubing by water pressure exerted on their outer surfaces, the higher the pressure the more firmly the flaps being seated. The section 10 may have a bed plate 18 affixed thereto as by means of braces 19 struck upwardly from the plate and welded to the section 10. The section 10 may also support an internally threaded coupling 40 welded thereto, by means of which vertical standards bearing sprinkler heads may be associated with the distribution system. The coupling herein illustrated and described is illustrative of many such couplings provided they have means such as annular flanges or annular grooves at the end edges thereof whereby collars may be locked in place, and provided the central section is restricted to limit inward insertion of lengths of tubing or otherwise so formed as to limit inward movement of the tubing beyond a desired amount.

The present invention comprises an adapter collar which may be clamped in the groove 15, preferably comprising a pair of arcuate members 20 hinged together at their lower ends, for example by means of a boss 21 on one of the members passing through an opening in the other member and peaned over at its end. The free ends of the members are provided with outwardly extending lugs 22 having holes drilled therethrough for reception of a bolt 23 which may be tightened by a nut 24 to clamp the collar onto the coupling. The parts are so proportioned as to leave a substantial space between the lugs 22 which is spanned by the bolt 23. A latch arm 25 is freely pivoted on bolt 23, the arm preferably comprising an outer handle portion 26 so shaped that the fingers of the hand may be inserted beneath the arm when it is in latching engagement as shown in Fig. 1, and the outer surface of the extremity thereof may be provided with an ear 27 for reception of a wire which may be twisted about the pipe to prevent accidental displacement by pastured stock. The forward or lower surface of the latch arm is provided intermediate its ends with a notch 30 pointing toward the free end of the latch arm, the forward lip of the notch being provided by a projection 31 pointing toward the pivoted end of the latch arm. The notch 30 is of sufficient diameter to receive a latch arm engaging member comprising a transverse abutment such as a bolt 32 mounted upon a strap 33 encircling the end of the tubing, and the projection 31 is of sufficient length to underlie a substantial part of the bolt 32 when the arm is in latching position as seen in Fig. 2. The latch arm is so pivoted as to have pivotal movement in a plane including the longitudinal axis of the coupling member.

The bolt 32 is supported between the outwardly projecting, spaced ends 34 of the strap 33 and the strap may be firmly clamped in place by a nut 35 on the bolt 32. The strap is so proportioned that a substantial space remains between the arms 34, in which the latch arm 25 may be received in order that the shank of bolt 32 may be latched into the notch 30 in the lever arm 25. The strap 33 is preferably provided with means to prevent its displacement such as a projection 36 on the inner surface thereof formed by displacing a portion of the strap inwardly by means of a punch or the like if the strap is made of suitable malleable material. If the tube is softer than the strap the projection 36 will displace a portion of the tube wall inwardly as indicated at 37. Conversely, a sharp tool may be used to punch both walls inwardly after the strap has been tightened in position, or a hole may be drilled partially through the strap to provide a thin wall at the bottom thereof which may be punched inwardly to lock the strap in position.

The parts are shown in Figs. 1 and 2 in the positions assumed when both the coupling and the tube are maintained in horizontal position by the contour of the ground. However, as indicated in dash lines, the parts may have angular displacement with respect to each other in any direction. This is particularly important in the vertical plane since the tube must be lifted to a slight angularity above the horizontal in order that it may be unlatched from the coupling member. The handle portion 26 of the latch arm extends beyond the clamp 33 and engages the upper surface of the tube so as to limit downward displacement thereof. When the tube is displaced upwardly it raises the arm 25 to the position shown in dash outline in Fig. 2 and displaces the bolt 32 slightly rearwardly, the combination of the two movements permitting the projection 31 to clear the bolt 32. The lever arm 25 may now be raised as by slipping the hand beneath the portion 26 or by pulling upwardly on a chain or the like attached to the ear 27. With the lever arm in the raised position the tubing may be withdrawn from the coupling or vice versa. It is to be appreciated that another length of tubing may be inserted in the opposite end of the coupling member. Likewise the coupling member may or may not be provided with means for attachment of sprinkler head supports or the like, and a similar device having but one open end may provide an end cap.

While I have herein illustrated and described means for adapting an existing form of coupling, the invention could comprise a coupling member having a lever arm such as the arm 25 pivoted to an ear or ears integral therewith. Various other modifications in details and arrangement will readily occur to those skilled in the art, and I claim as my invention all such modifications as come within the true spirit and scope of the appended claims.

I claim:

1. A coupling for tubing comprising a tubular member adapted to receive an end of a length of tubing, an annular flange adjacent the end of said member, a pair of arcuate members hingedly connected together and having outwardly extending lugs at their free ends, a first bolt spanning said lugs whereby said arcuate members may be clamped about said tubular member behind said flange, said arcuate members being so proportioned that said lugs are spaced apart, a latch arm freely pivoted on said first bolt between said lugs and having a hook projection on its forward edge intermediate its ends, said projection being directed toward the pivoted end of the arm, a strap shaped to embrace a length of tubing which may be received in said member, said strap having outwardly directed, spaced ends, and a second bolt spanning said ends whereby said strap may be clamped upon the tubing, said ends being spaced sufficiently to receive said latch arm therebetween and said second bolt being spaced from the tubing whereby said projection may hook thereover.

2. The structure set forth in claim 1 wherein said tubular member is constricted inwardly from its end to prevent the entry of the tubing beyond a limited extent, and said strap is so spaced from the end of said tubing that separation of said projection from said second bolt can be accomplished only upon angular displacement of said tubing relative to said tubular member in the direction toward said latch arm, and said latch arm is curved so that the tip thereof engages the surface of the tubing beyond the strap when said projection is in engagement with said second bolt.

3. Coupling means for joining together lengths of tubing comprising a coupling member adapted to receive the end of a length of tubing therein, said coupling member having an intermediate restricted portion to limit inward movement of the tubing and having a peripheral groove externally thereof adjacent its opening, a collar adapted to be clamped onto said coupling member in said groove, a latch arm pivotally mounted upon said collar, the axis of pivoting thereof being substantially normal to a plane including the longitudinal axis of the coupling member and the latch arm adapted to project forwardly over the tubing, a strap adapted to be clamped around the tubing beyond the portion which may be inserted in said coupling member, means to constrict said strap comprising a transverse bolt spaced from the surface of the tubing, said latch arm comprising a notch adapted to engage said bolt upon relative angular displacement of the tubing and coupling member when telescoped together with the tubing abutting the intermediate restricted portion of the coupling member and the direction of angular displacement of the tubing is toward said latch arm.

HARRY L. YAGER.

REFERENCES CITED

The following references are of record in the file of this patent:

UNITED STATES PATENTS

| Number | Name | Date |
|---|---|---|
| 715,621 | Stifter | Dec. 9, 1902 |
| 1,240,098 | Sweeney | Sept. 11, 1917 |
| 2,013,217 | Olmstead | Sept. 3, 1935 |
| 2,253,232 | Gheen | Aug. 19, 1941 |
| 2,256,845 | Lanninger | Sept. 23, 1941 |